June 10, 1952  O. A. JOHNSON  2,599,639
MACHINE FOR SHARPENING TOOLS
Filed Feb. 23, 1951  6 Sheets-Sheet 2

FIG. 2

INVENTOR.
OLAF A. JOHNSON
BY
Richard W. Treverton
ATTORNEY

June 10, 1952     O. A. JOHNSON     2,599,639
MACHINE FOR SHARPENING TOOLS Filed Feb. 23, 1951     6 Sheets-Sheet 4

INVENTOR.
OLAF A. JOHNSON
BY
*Richard W. Treverton*
ATTORNEY

June 10, 1952     O. A. JOHNSON     2,599,639
MACHINE FOR SHARPENING TOOLS
Filed Feb. 23, 1951     6 Sheets-Sheet 5

INVENTOR.
OLAF A. JOHNSON
BY Richard W. Treverton
ATTORNEY

June 10, 1952

O. A. JOHNSON 2,599,639

MACHINE FOR SHARPENING TOOLS

Filed Feb. 23, 1951

INVENTOR.
OLAF A. JOHNSON
BY Richard W. Treverton
ATTORNEY

Patented June 10, 1952

2,599,639

UNITED STATES PATENT OFFICE 2,599,639

MACHINE FOR SHARPENING TOOLS

Olaf A. Johnson, Irondequoit, N. Y., assignor to The Gleason Works, Rochester, N. Y., a corporation of New York Application February 23, 1951, Serial No. 212,344

16 Claims. (Cl. 51—124)

The present invention relates to a machine for sharpening cutting tools, particularly gear cutting tools, the machine being of the general type disclosed in Patent No. 1,908,476, granted to S. H. Earl on May 9, 1933.

The machine comprises a frame which journals the spindle of an abrasive sharpening wheel, the frame also supporting a swinging head that carries a spindle for the tool that is to be sharpened. The arrangement is such that the head may be swung on the frame to carry the blades of the tool back and forth across the working face of the rotating sharpening wheel.

According to the present invention a power driven mechanism is provided to automatically index the tool spindle for sharpening successive blades of the tool, and the same rotating assembly that forms the drive part of this indexing mechanism includes a cam which swings the head on the frame in the desired time relationship with the indexing action. The cam operates a crank that is journaled in the swinging head and is connected to the frame by a link.

The same swinging head and link are utilized in a mechanism that is provided for dressing the sharpening wheel. To this end a diamond or other suitable dressing element is mounted on the swinging head; and the head is swung, to carry this element across the working face of the wheel, by a crank that is journaled in the frame and is connected to the link. During the tool sharpening operation this crank is held stationary, the head then being swung back and forth by the power driven crank on the head. During the dressing operation the crank on the head is held stationary and the crank on the frame is moved to swing the head. The head is moved through two different arcs by the respective cranks, and hence the tool being sharpened and the dressing element although both carried by the head do not contact the sharpening wheel at the same time. The novel features referred to in this and the immediately preceding paragraph fulfill the primary objective of the invention which is to provide a simple mechanism for accomplishing the several functions described that is inexpensive to manufacture, and is accurate and dependable in operation.

The invention also provides a simple, rugged and inexpensive mechanism for effecting the wheel dressing operation at a uniform preselected velocity irrespective of the force applied by the operator to the dresser operating lever. To this end the operating lever is secured to the crank that is journaled in the frame, and the motion of the lever by the operator energizes a spring which moves the crank on the return or dressing stroke thereof. At the end of the spring energizing stroke the lever is engaged and held by a latch, and to effect the wheel dressing the operator releases this latch. The rate of the ensuing dressing stroke is controlled by dash-pot means, and may be varied as desired by adjustment of a metering valve. Provided that the operator moves the lever far enough to apply the latch, the motion following the next release of the latch will be through the full stroke of the dressing element.

The foregoing and other objects and advantages will become apparent from the following detailed description made in connection with the drawings, of which.

As shown in the drawings the machine comprises a frame 20 having a stationary spindle housing 21 in which is journaled a vertical spindle 22 for a cup-shaped abrasive grinding wheel. The active surface of this wheel is in a horizontal plane, its outer and inner edges in this plane being indicated by circles 23 and 24 respectively in Fig. 2. The power means for rotating the spindle is not a part of the present invention and hence is not illustrated.

The tool 25 whose cutting blades are to be sharpened (the tool illustrated being a disc milling cutter of the general type employed in Carlsen application Serial No. 765,291, now Patent No. 2,567,273, granted September 11, 1951, and also the diamond element 26 for dressing the wheel, are carried by a head 27 that is mounted to swing relative to the frame 20 about a vertical axis 28 during the tool sharpening and wheel dressing operations. The head 27 is carried by an arm 29 upon which it is adjustable about horizontal axis 31 to vary the rake angle to be ground on the tool during sharpening. The arm is arranged to swing about axis 28 as a unit with a post 32, and it is adjustable vertically upon this post. The post itself is journaled in suitable bearings in the frame 20.

Figures 3, 5:
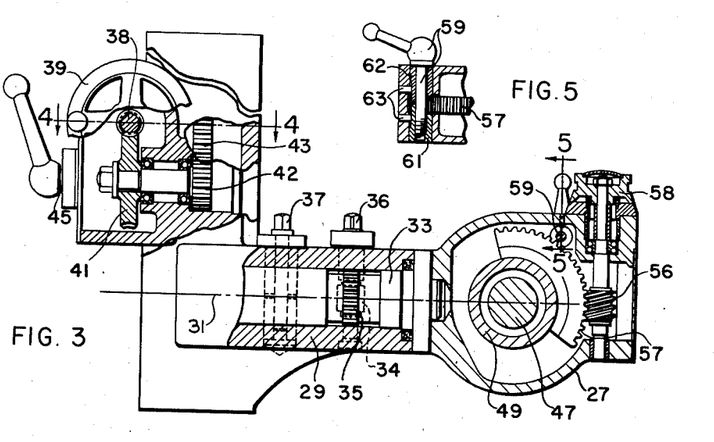
Fig. 3 is a view with some parts shown in elevation and others in vertical section in the planes indicated by line 3—3 of Fig. 2.
Figs. 4 and 5 are detail sections taken as indicated by lines 4—4 and 5—5 respectively of Fig. 3.

The connection of the head 27 to arm 29, shown in Fig. 3, comprises a trunnion 33 secured to the head and journaled within a bore in the arm. A worm 34 is journaled in the arm and meshes with a worm wheel 35 provided on the trunnion. By rotating the squared projecting end 36 of the worm shaft, the worm wheel may be rotated to adjust the head about axis 31. It may be locked in adjusted position by a screw 37 in the arm that is threaded to a nut that clamps upon the trunnion.

Figure 4:
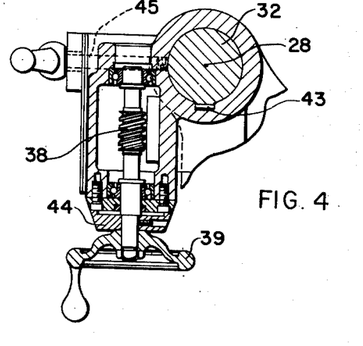

As shown in Figs. 3 and 4 there is journaled in the arm 29 a worm 38 that is turned by a handwheel 39 to drive a wormwheel 41.

The latter is secured to a shaft that is also journaled in the arm and carries a spur pinion 42 which rolls upon a rack 43 on the post 32. Accordingly the arm 29, and the head 27 that is mounted on it, may be adjusted vertically on the post by turning the handwheel 39. A graduated dial 44 movable as a unit with the handwheel enables the operator to make this adjustment accurately. The arm may be secured in any adjusted position by tightening a clamping screw 45 which is threaded into the arm against the post. Flexible sleeves 46 around the post 32 prevent the ingress of foreign material into the post bearings and into the adjusting and locking means that have just been described.

The tool 25 is mounted on a spindle 47 that is journaled on anti-friction bearings 48 within a spindle housing 49 that in turn is journaled in the head 27, coaxially with the spindle, on anti-friction bearings 51. For preventing entrance of foreign matter a seal 52 is disposed between the spindle and a nose ring 53 that is secured to the head. Affixed to the spindle housing is an index housing 54 containing an index mechanism through which a motor 55 mounted on the index housing intermittently turns the tool 25 to bring its cutting edges successively into position to engage the sharpening wheel. The spindle 47, its housing 49, the index housing 54 and the motor 55 may be adjusted as a unit about the spindle axis in the bearings 51 by means of worm 56 and wormwheel segment 57. The segment is affixed to the spindle housing while the worm is journaled in the head 27, as is best shown in Fig. 3. A graduated knob 58 secured to the shaft of worm 56 enables the operator to turn the worm accurately through small angles to thereby make fine adjustments of the tool 25 about the spindle axis. Such an adjustment determines the amount of stock that will be removed from the blades of the tool during the ensuing sharpening operation. The segment 57 may be locked in any adjusted position by tightening a screw 59 (Figs. 3 and 5) that is threaded to a nut 61 to thereby clamp the segment between the nut and a sleeve 62 through which the screw extends. The nut and sleeve are keyed against rotation within the head 27 by pins 63.

The drive for the indexing mechanism (Figs. 6 and 7) within housing 54 includes a worm 64 on the shaft of motor 55 for driving a worm wheel 65 that is secured to the hub of a face cam 66. This cam is rotatable on anti-friction bearings 67 mounted on a stub shaft 68 that is fixed to the index housing. Around the periphery of the cam 66 is a seal for retaining lubricant in that part of the interior of the housing which contains the worm and wheel 64, 65. Secured to the cam 66 to rotate therewith is the drive disc 69 and pin 71 of a Geneva motion. The driven member of this motion is an index plate or disc 72 having radial slots 73 to receive drive pin 71. The disc 72 has a flange 74, and slot 75 in the periphery of the disc extend through this flange to provide passages for an arcuate ridge 76 that is formed on the drive disc 69. The arrangement is such that for a portion of each revolution of the disc 69 the pin 71 is engaged in one of the radial slots 73, and thereby is driving the disc 72, and that just before and just after this drive a portion of each revolution the arcuate ridge is engaged in a slot 75 to positively hold the driven disc against rotation. The driven disc is fastened by screws 77 to the inner end of spindle 47, to rotate the latter as a unit therewith.

To accurately lock the tool in the various angular positions to which it is advanced by the Geneva motion, there is provided a lock-up dog 78 that is adapted to wedge into the notches 75 in the driven disc or index plate 72. This dog is carried by an arm 79 that is pivoted at 81 to the index housing 52. The arm is urged, clockwise in Fig. 7, by a plunger 82 to wedge the dog into lock-up engagement in whichever notch 75 is brought into alignment with it by the Geneva motion. The plunger 82 is carried by the arm 79 and is backed by a spring 83. The plunger engages a screw 84 which is threaded to the housing 52 and thereby provides a means for releasing the compression of the spring when changing the index plate 72. A roller 85 on the arm 79, arranged to roll on a cam surface 86 that forms the periphery of the Geneva drive disc 69, serves to lift the dog 78 from the notch 75 just before the pin 71 enters into driving engagement in a notch 73 of index plate 72.

Figure 1:
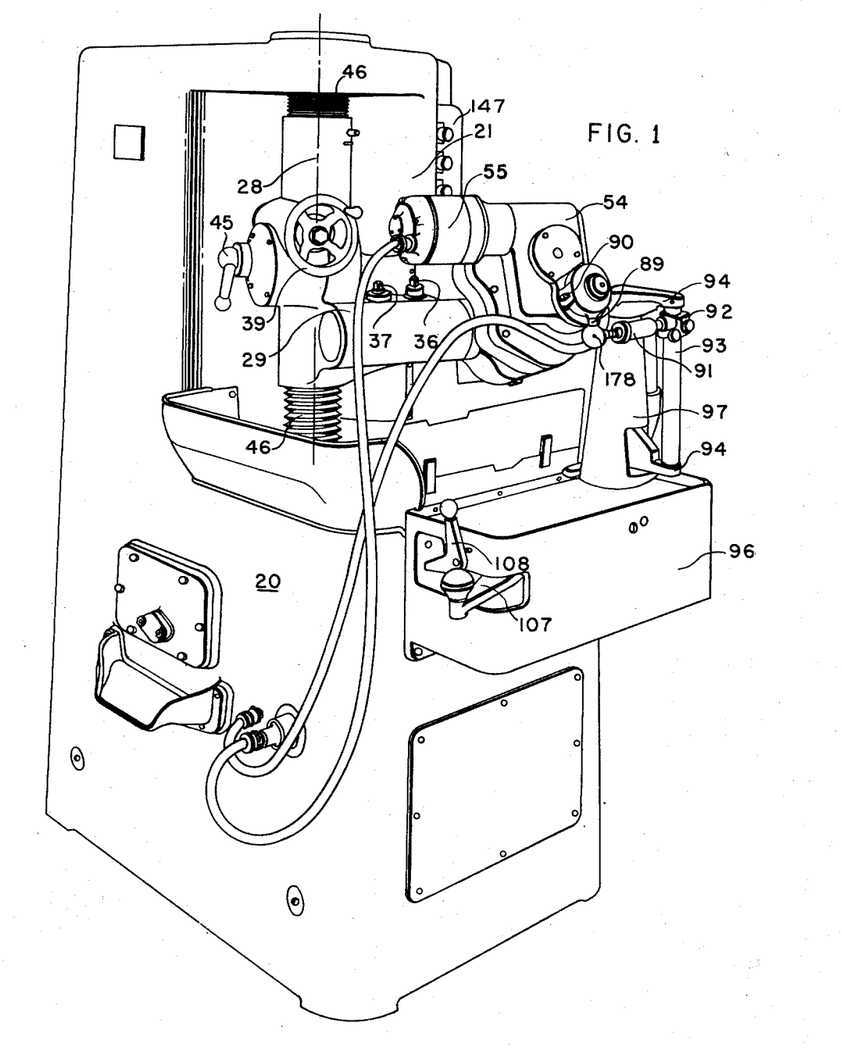
Fig. 1 is a perspective view of the machine.
Figure 8:
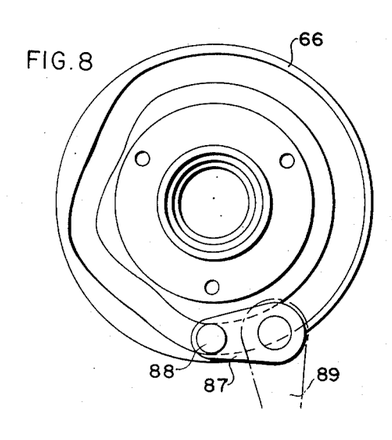
Fig. 8 is a detail elevational view of a cam shown in Figs. 6 and 7, and a related crank.

For oscillating the tool head 27 about upright axis 28 during a tool sharpening operation there is provided a crank arm 87 having a roller follower 88 engaged in the slot of the cam member 66. The arm 87 is affixed to a shaft that is journaled in the housing 52 and carries another arm 89 (Figs. 1, 2 and 8) on the outside of the housing. As shown in Fig. 8 the groove of cam 66 is so formed that during each revolution it will oscillate the arm 87 twice and then hold it stationary (while the tool is indexed as hereinbefore described). This arm 89 has a ball-and-socket type of universal joint with one end of a link 91 whose opposite end is connected by a similar universal joint to a fitting 92. The last mentioned universal joint has a section that is readily detachable from fitting 92 so that the link may be disconnected easily for a purpose that will be described hereinafter. The link comprises sections having a screw threaded connection to each other whereby its length may be readily adjusted. The fitting 92 is keyed for vertical adjustment upon an upright pin 93 whose ends are connected by arms 94 to a vertical shaft 95.

Figure 9:
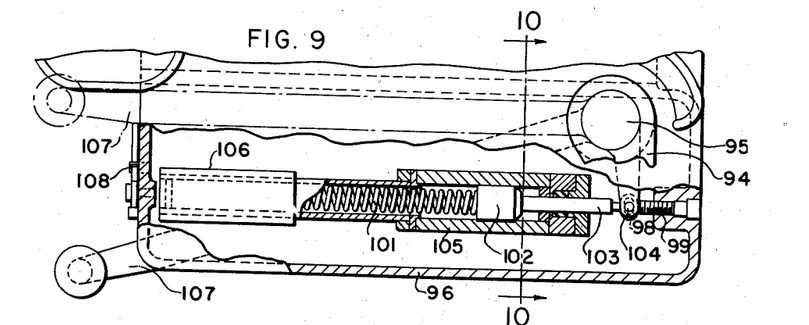
Fig. 9 is a detail plan section illustrating part of the wheel dressing means.
Figure 10:
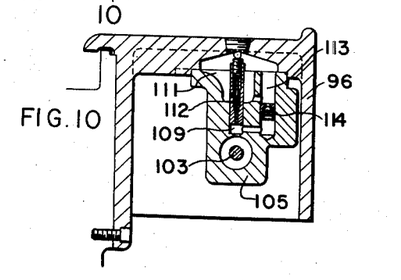
Fig. 10 is a detail vertical section taken as indicated by line 10—10 of Fig. 9.

The shaft 95 is journaled in a bracket 96 that forms a part of the machine frame, and in a tubular post 97 on the bracket. Affixed to the end portion of shaft 95 within bracket 96 is an arm 98 (Fig. 9) which during a tool sharpening operation is held against an adjustable screw stop 99 on the bracket. The holding means comprising a spring 101 which abuts a piston 102 whose piston rod 103 is connected to the arm 97 by a pin 104. The piston operates in a cylinder 105 secured to bracket 96 (Figs. 9 and 10), and the spring is confined in the cylinder and in a tubular extension thereof to which a cap 106 is screw threaded. By adjusting this cap the compression of the spring 101 may be adjusted.

In addition to its function of holding the arm 98 against stop 99 during a tool sharpening operation, the spring 101 also serves as the means for swinging the arm 29 and head 27 about vertical axis 28 during a wheel dressing operation. To enable the spring to be further compressed or energized for this purpose an operating lever arm 107 is affixed to the shaft 95. When this lever is moved clockwise in Fig. 9, to its limit position indicated by broken lines, a latch 108 drops behind it. The latch is pivoted to the bracket and is so weighted that it is urged by gravity to its engaged position, in a counterclockwise direction as it appears in Fig. 1. Upon release of the arm 107, by the operator moving latch 108 clockwise, the spring will act through arm 98 to turn the shaft 95 and arm 94 (counter-clockwise in Fig. 2 from the broken to the full line position of arms 94), and thereby act through the link 91 to swing the head 27 about upright axis 28 (also counter-clockwise in Fig. 2).

For controlling the rate at which the spring 101 swings head 27, the cylinder chambers on opposite sides of the piston 102 are filled with liquid and are interconnected by passages 109 and 111 between which is interposed screw adjusted metering pin 112 (Fig. 10) which controls the rate of displacement of fluid from the right to the left side of the piston, i. e. in the direction from passage 109 to passage 111. This control is not effective during one stroke of the piston 102, when the spring is being energized by manual operation of lever 107, because of a by-passage 113 connecting the passage 109 and 111 around the metering pin. This by-passage is closed by a ball check valve 114 when the direction of fluid flow is from passage 109 to passage 111.

Figure 6:
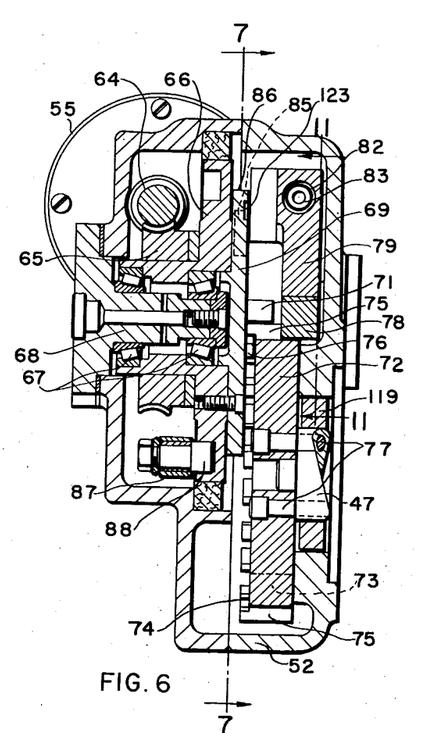
Fig. 6 is a vertical sectional view taken along line 6—6 of Figs. 2 and 7.
Figure 7:
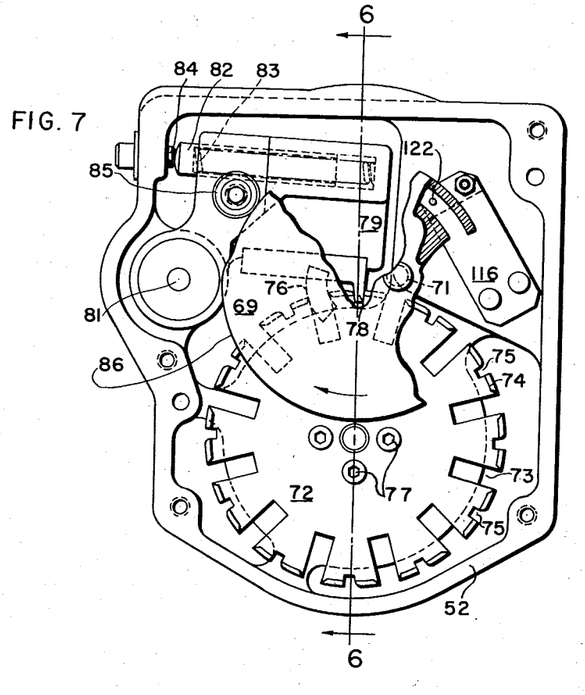
Fig. 7 is a section taken as indicated by line 7—7 of Fig. 6.
Figure 11:
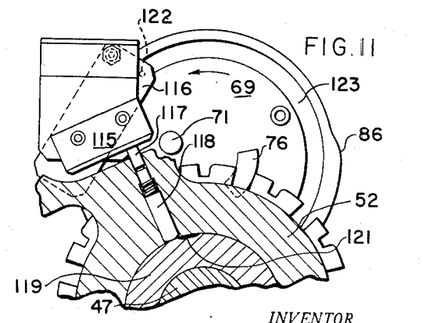
Fig. 11 is a fragmentary vertical sectional view in a plane indicated by line 11—11 of Fig. 6.

For the purpose of stopping the motor 55 automatically after all the blades of the tool have been sharpened and a subsequent index operation has been completed (i. e. after the lock-up dog 78 has become effective) micro-switches 115 and 116 (Figs. 7 and 11) are provided, both being secured within the chamber of the index housing to the right of the seal shown in Fig. 6 around cam 66. Switch 115 has a spring-backed actuating stem 117 that engages the outer end of a pin 118 that is slidably mounted in the housing 52 and is also backed by a spring. The inner end of the pin engages a ring cam 119 that is on tool spindle 47 and is keyed to index plate 72. Cam 119 has a recess 121 into which the pin 118 is pressed by its backing spring when the spindle is in position for sharpening the first blade of the tool. This motion of the pin allows the stem 117 to shift outwardly, thereby operating a movable contact within the housing of switch 115.

The micro-switch 116 has a spring-backed actuating stem 122 that contacts the face of Geneva drive disc 69 in the path of an arcuate cam recess 123. The latter is so positioned on disc 69 in relation to cam surface 86 thereof that the stem 122 drops into it under the urge of its backing spring when the dog 78 has moved into lock-up engagement with index plate 72. The stem is cammed in the opposite direction, out of the recess 123, just before the dog 78 is swung out of such lock-up engagement, immediately preceding the next indexing operation.

Figure 12:
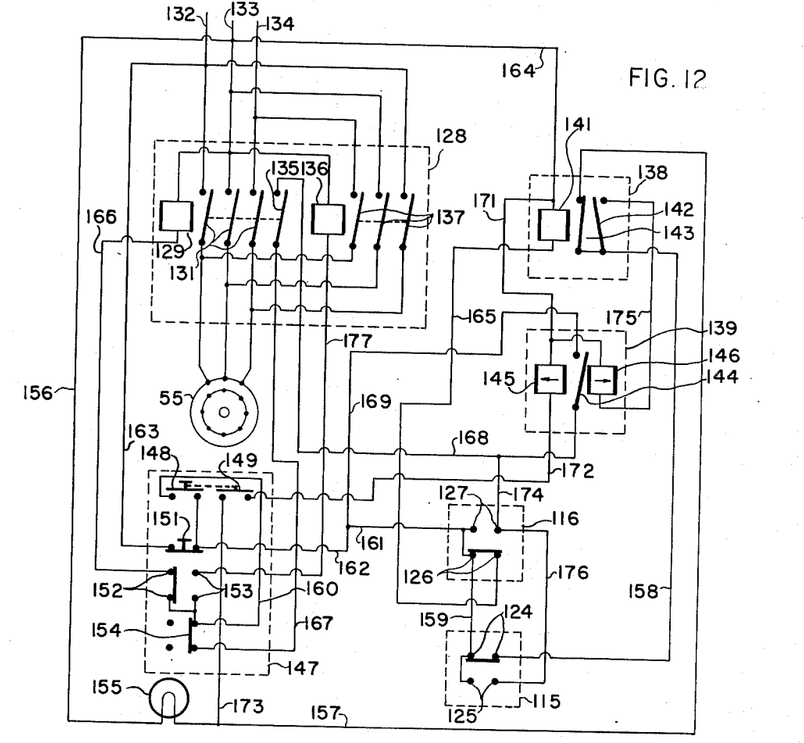
Fig. 12 is a wiring diagram of the control means for the motor that is shown in Figs. 1, 2, and 6.

The wiring diagram, Fig. 12, represents the condition of the circuit for the motor 55 when the machine is ready to be started. At this time the pin 118 is in the recess 121 and the movable contact of the switch 115 is closed across fixed contacts 124 thereof, the other fixed contacts of the switch, which are designated 125, being open. Stem 122 is depressed into switch 116 since in the position shown an indexing operation has just been completed and the stem has ridden out of cam groove 123. In this condition of the switch 116 its movable contact is closed across fixed contacts 126, the other fixed contacts, 127, of the switch being open.

The control means for the motor 55 includes a controller 128 that contains a relay comprising a winding 129, three normally open movable contacts 131 which when closed connect the motor for forward operation to main electrical conductors 132, 133 and 134 of a three-phase system, and a normally open movable contact 135 which when closed establishes a holding circuit. The unit 128 also contains a relay comprising a winding 136 and three normally open movable contacts 137 which when closed connect the motor for reverse operation to conductors 132, 133 and 134.

The control means also includes relays 138 and 139. Relay 138 has a winding 141, a normally closed movable contact 142 and a normally open movable contact 143. Relay 139 has a movable contact 144, a winding 145, which when energized closes contact 144, and a winding 146, which when energized opens the contact 144. Relay 139 is of a type whose movable contact remains in its last operated position until the relay is subsequently energized.

The control means further includes a bank 147 of manually operable switches comprising a push button type of "start" switch having normally open movable contacts 148 and 149; a normally closed "stop" switch 151; a reversing switch whose movable contact is adapted either to close fixed contacts 152 for forward operation of the motor or to close fixed contacts 153 for reverse operation; and a switch 154 which when open allows the motor to run only so long as the start switch is held closed, to provide for jogging, and, when it (switch 154) is closed, allows the motor to run through its full cycle upon the start switch being closed only momentarily.

A high resistance signal lamp 155 is provided to show the operator when the tool spindle 47 is positioned for sharpening of the first blade of the tool (when pin 118 is in recess 121, Fig. 11) and when dog 78 is in lock-up position. The circuit for this lamp is from main lead 133 through lead 156, the lamp, lead 157, normally open but now closed contact 143 of relay 138, lead 158, contacts 124 of switch 115, leads 159, 161 and 162, stop switch 151, and lead 163 to main lead 132. Contact 143 of relay 138 is closed when contacts 126 of switch 116 are closed (when pin 118 is in recess 121, Fig. 11), because the relay's winding 141 is then energized, the circuit therefor being from main lead 133 through lead 164, winding 141, leads 165, contacts 126, leads 161 and 162, stop switch 151 and lead 163 to main lead 132.

With lamp 155 lighted, the reversing switch in forward position and the jog switch in continuous run position, if the start switch button is momentarily depressed, a circuit is established from main lead 133 through motor controller forward winding 129, lead 166, forward contacts 152 of the reversing switch, lead 160, start switch contact 148, stop switch 151 and lead 163 to main lead 132. The resulting energization of winding 129 closes motor controller contacts 131, setting motor 55 in forward operation, and also closes contact 135 which establishes a holding circuit so that the motor will continue to run even though the start switch contact 148 is now opened. This holding circuit provides a shunt around contact 148, from reversing switch contacts 152 through jog switch 154, lead 167, contact 135, lead 168, contact 144 of relay 139 and leads 169 and 162 to the stop switch 151. This circuit is possible because at this time contact 144 of relay 139 is closed, due to winding 145 of the relay having been energized when start switch contact 149 was momentarily closed. The circuit for energizing winding 145 is from main lead 133 through leads 164 and 171, the winding 145, lead 172, start switch contact 149, leads 173 and 157, contact 143 of relay 138, lead 158, contacts 124 of micro-switch 115, leads 159, 161 and 162, stop switch 151 and lead 163 to main lead 132.

Unless sooner stopped by the operator opening stop switch 151 (which opens the circuit for controller winding 129) the machine will now run completely through its sharpening cycle. Just prior to the first indexing operation, when dog 78 moves to unlock index plate 72, the switch 116 will be operated to open its contacts 126 and close its contacts 127. This will provide a shunt circuit (from lead 168 through lead 174, contacts 127 and lead 161) around contact 144 of relay 139 which is opened by energization of winding 146. The circuit for the latter is from main lead 133 through leads 164 and 171, winding 146, lead 175, contact 142 of relay 138, lead 158, contacts 124 of switch 115, leads 159, 161 and 162, stop switch 151, and lead 163 to main lead 132. Contact 142 of relay 138 is closed at this time because winding 141 has been deenergized by opening of contacts 126 of the switch 116.

As the first indexing operation proceeds, the spindle 47 is turned, moving pin 118 out of recess 121 (Fig. 11) thereby opening contacts 124 and closing contacts 125. The latter provides a shunt in the holding circuit, via leads 174, 176, contacts 125 and leads 159 and 161, around the contacts 127 of switch 116 so that when the latter contacts are opened, after the dog 78 has next locked-up, the holding circuit for motor controller winding 129 is maintained.

Contacts 125 remain closed until after the last blade of the tool has been sharpened and the spindle 47 is being indexed to bring the first blade again into sharpening position. At the initiation of the indexing the switch 116 is operated to close contacts 127, which temporarily provides a shunt around contacts 125 of switch 115, so that machine operation continues even after the latter contacts are opened as an incident to the actual indexing operation during which pin 118 drops into recess 121. However as soon as the dog 78 has moved to lock-up position the contacts 127 of switch 116 are opened and the motor 155 is deenergized. Also the winding 141 of relay 138 is energized, causing the lamp 155 to light, and thereby advising the operator that the sharpening cycle has been completed.

The machine may be jogged forwardly by opening the switch 154. This cuts out the holding circuit for the motor controller and hence the motor 55 will run only so long as the start switch button is held depressed, maintaining the contact 148 closed. Either forward or reverse jogging may be effected. For reverse the switch is moved to close contacts 153 with the result that whenever start switch contact 148 is closed a circuit is established through the controller winding 136, closing the motor reverse contacts 137. The circuit is from main lead 133 through winding 136, lead 177, reverse switch contacts 153, lead 160, start switch contact 148, stop switch 151, and lead 163 to main lead 132.

From the foregoing description of the machine it is believed that the operation thereof will be understood. However a typical operating sequence may be briefly summarized as follows: First with the link 91 temporarily disconnected to allow the head 27 to swing freely about axis 28, the dressing element 26 is adjusted in its mounting; and then the head is adjusted angularly with respect to arm 29, to the desired sharpening angle. The machine, with link 91 now connected, is jogged forward to move the head to the limit of its counter-clockwise movement about axis 28, as viewed in Fig. 2, this position being indicated to the operator by a pointer 90 on arm 89. The spindle housing 49 is adjusted in the head about the spindle axis to bring the motor 55 to a horizontal position. The tool 25 is mounted on the spindle 47 with one blade thereof in approximately the horizontal plane of the tip of the dressing element 26. Then, with the aid of the handwheel 39, the head is adjusted to bring the dressing element to the wheel. The fitting 92 is adjusted on pin 93 until the link 91 is horizontal and the length of the latter is then adjusted to bring the tool, relative to the wheel, to the full depth to which it is to be sharpened. The machine is then jogged in reverse (with contacts 153 closed) until the lamp 155 lights. Again with the aid of the handwheel 39, the head is raised by whatever small amount of stock is to be dressed off the wheel. The reverse switch is then set to close forward contacts 152. Next the wheel is dressed by moving lever 107 to its limit position (to the left in Figs. 1 and 2) and by then releasing latch 108. After the ensuing dressing stroke is completed the start switch button is pressed, whereupon the machine will automatically run through its sharpening cycle as hereinbefore described, the head swinging each blade of the tool twice across the wheel and then indexing to the next blade; and stopping when the first blade has been indexed to its original position.

Figure 2:
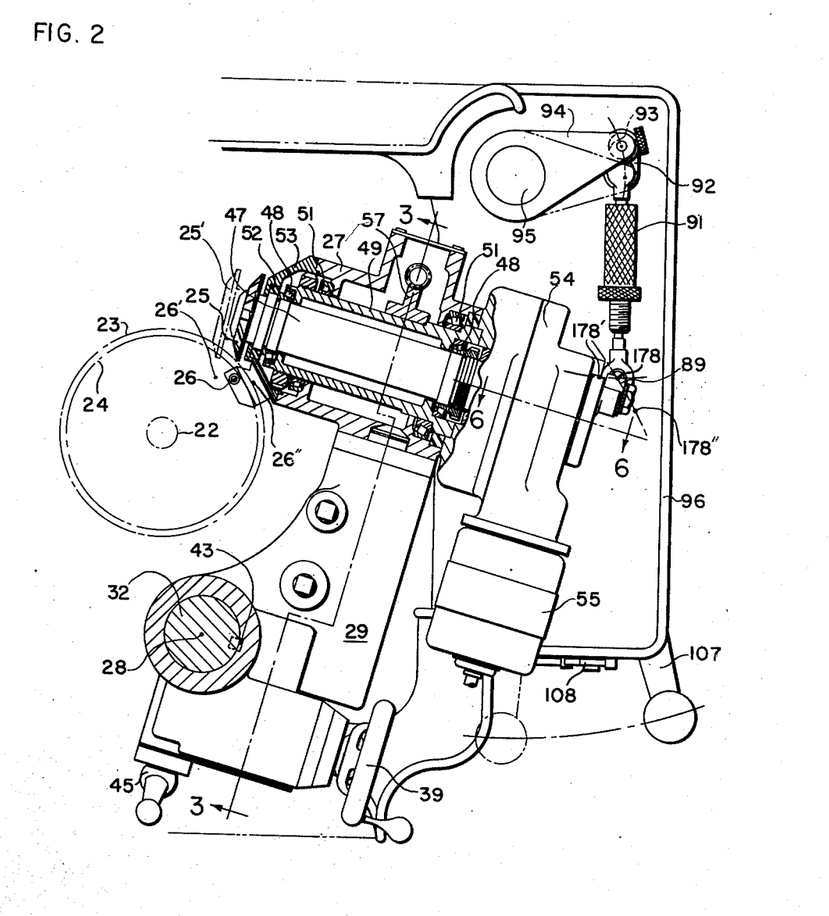
Fig. 2 is a fragmentary plan view with parts broken away and appearing in section.

The path of the tool and dressing element during the sharpening and dressing operations is best seen from Fig. 2. During sharpening the arms 94 remain in the full line position and the oscillation of the arm 89 from the position shown in Fig. 2 carries the center 178 of its universal joint connection (with link 91) to the position shown at 178', swinging the head about axis 28 to carry the tool to and from the broken line position thereof indicated at 25'. The dressing element 26 likewise moves to and from the position indicated at 26', but in doing so remains entirely within the inside periphery 24 of the wheel and hence does not contact the wheel. During dressing the point 178 remains fixed relative to head 27, and the latter is swung by oscillation of arm 94 between the full line and broken line positions thereof, which shifts the point 178 to and from the position shown at 178''. This moves the dressing element across the face of the wheel, to and from the position thereof shown at 26''.

Figure 13:
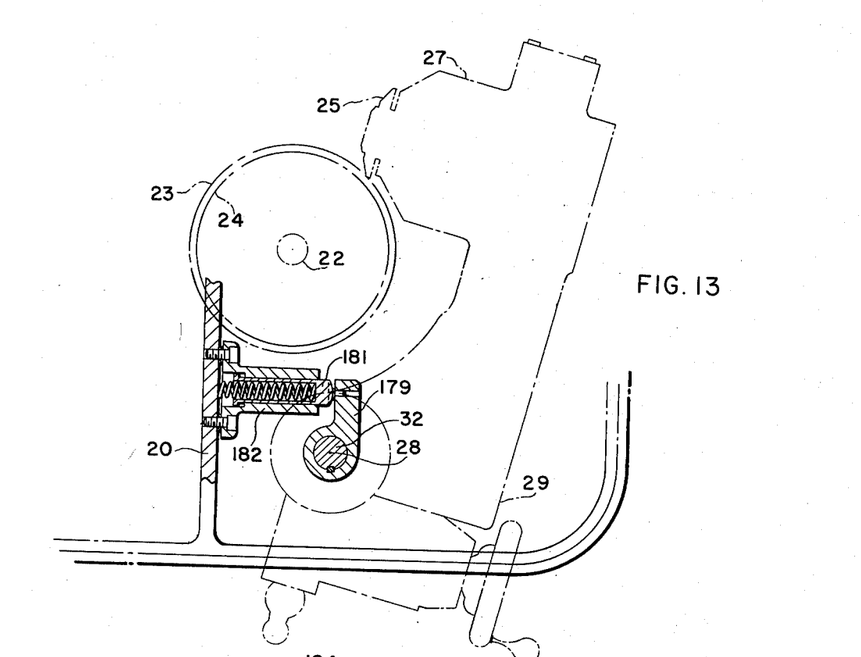
Fig. 13 is a detail horizontal sectional view of a lost-motion take-up means to insure equal travel of the tool as it oscillates while being sharpened.

In order to take up all lost motion in the means for oscillating the tool head during a sharpening operation, so that the tool will travel exactly the same distance across the face of the wheel on every stroke of every oscillation, the means shown in Fig. 13 are provided. These include an arm 179 secured to the lower portion of post 32, and a spring-backed plunger 181 abutting the arm for exerting a clockwise moment (as viewed in plan) about axis 28 on the post, and on the arm 29 and head 27 which swing with the post. The plunger is guided in a bracket 182 that is secured to the frame 20. The spring-backed plunger thus acts constantly to tension the linkage 92, 91, 89 and to urge the crank arm 87 clockwise (in Fig. 8) so that follower roller 88 constantly engages the same surface of the cam 66. In this way any lost motion in the system is taken up and travel of the tool 25 across the sharpening wheel will repeat accurately on successive rotations of the cam 66.

Figure 14:
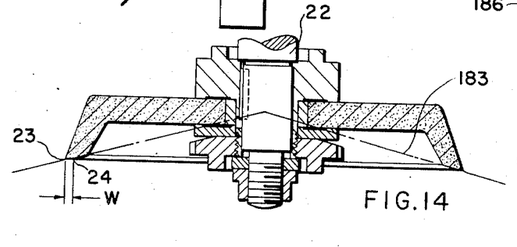
Fig. 14 is a vertical sectional view through the abrasive sharpening wheel, indicating the manner in which it is rough-dressed; and, Figs. 15 and 16 are plan and elevational views of a wheel dressing attachment for mounting on the tool spindle.
Figure 15:
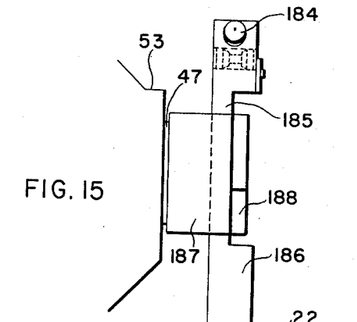
Figure 16:
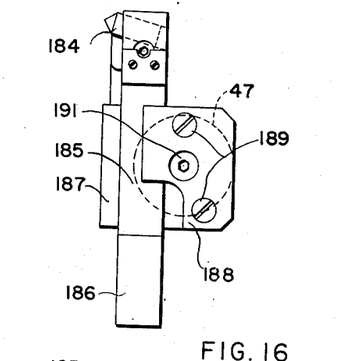

In Fig. 14 is shown a preferred form abrasive sharpening wheel that is adapted for use with the machine of the present invention. It is preferred to keep the active face of the wheel narrow in order to prevent burining of the tool that is undergoing sharpening. This narrow face width W of the wheel (the width between the edge circles 23 and 24 of Fig. 2) may be maintained without sacrificing strength of the wheel by periodically rough dressing to a conical surface as indicated at 183. For performing such dressing the means shown in Figs. 15 and 16 may be employed. This means comprises a dressing element 184 which preferably has a diamond tip and is mounted in holder that has a guide portion 185 and a handle portion 186. The guide portion is received in a guideway provided in a fixture, comprising a block 187 and a plate 188, held together by screws 189. The fixture may be attached to the forward end of the spindle 47 by a screw threaded fastener 191 at any time when a tool 25 is not mounted on the spindle.

After the fixture has been attached, the spindle 47 may be turned by the adjusting means 58, 56, 57 (Fig. 3) so that the element 184 may dress the wheel to a conical surface 183 of the desired cone angle when the handle 186 is reciprocated manually by the operator. The head 27 can be raised or lowered by means of the handwheel 39, as hereinbefore described, so that the proper amount of stock can be dressed off of the wheel to bring its active face to the desired width W.

In order to adapt the machine to sharpen tools having a different number of cutting blades, it is only necessary to substitute a different index plate 72 and drive the disc-pin unit 69, 71. Such substitution is easily effected since the index housing 52 comprises sections that are separable, upon the line 7—7 of Fig. 6, upon removing the screws that hold them together. Upon such separation both of the members 71 and 72 are made accessible. Because of the seal around cam 66 such separation does not result in loss of lubricating oil contained in the part of the housing containing the worm and wheel 64, 65.

The foregoing disclosure is made by way of example to illustrate and explain the inventive principles involved, and not by way of limitation, there being no intention to limit the scope of the invention except as may be required by the appended claims.

I claim as my invention:

1. A machine for sharpening gear cutting tools and the like comprising a frame, a wheel spindle journaled in the frame, a head for supporting a tool to be sharpened, means for mounting a dressing element on said head, the head being mounted to move on the frame for carrying the tool and the dressing element across the active face of a wheel on the wheel spindle, a member connected to both the head and the frame, means on the head for shifting the head relative to said member to thereby move the head for carrying the tool across said face of the wheel, and means carried by the frame for shifting said member relative thereto to thereby move the head for carrying the dressing element across said face of the wheel.

2. A machine as characterized by claim 1 in which the head is mounted to swing on the frame, and the motions of the head effected by the means on the head and the means carried by the frame are swinging motions.

3. A machine for sharpening cutting tools comprising a frame, a wheel spindle journaled in the frame, a head for supporting a tool to be sharpened, means for mounting a dressing element on said head, the head being mounted to swing on the frame for carrying the tool and the dressing element across the active face of a sharpening wheel on the spindle, a first crank journaled in the head, a second crank journaled in the frame, a link connecting said cranks, means carried by the head for operating the first crank to swing the head for carrying the tool across said face of the wheel, and means carried by the frame for operating the second crank to swing the head for carrying the dressing element across said face of the wheel.

4. A machine as characterized by claim 3 in which each of the means for operating the cranks is arranged to hold its crank stationary while the other crank is being operated.

5. A machine as characterized by claim 3 in which the means for operating the second crank comprises a spring, dash-pot means for controlling the velocity at which the spring operates the second crank, and a latch for holding the second crank cocked for operation by the spring.

6. A machine as characterized by claim 3 in which the means for operating the first crank comprises a drive member journaled for continuous rotation in the head, a cam on said drive member, and a cam follower on the first crank.

7. A machine as characterized by claim 6 in which a resilient means is provided to constantly urge swinging motion of the head in one direction to thereby hold the cam follower constantly against one face of the cam.

8. A machine as characterized by claim 6 in which there is a tool spindle journaled in the head for supporting the tool, and a mechanism for indexing the tool spindle intermittently in time with operation of said first crank, said mechanism including a drive element carried by the rotatable drive member and a driven element secured to the tool spindle.

9. A machine as characterized by claim 8 in which the driven element comprises a notched index plate, a plunger is carried by the head for locking engagement in the notches of the plate, and a cam is provided on the drive member for effecting operation of the plunger in time with the intermittent motion of the driven element.

10. A machine for sharpening cutting tools comprising a frame, a wheel spindle journaled in the frame, a tool head having a tool spindle journaled therein, means for mounting a dressing element on the head, the head being mounted to swing on the base for carrying a tool on the tool spindle and the dressing element across the active face of a sharpening wheel on the wheel spindle, an intermittent indexing mechanism including a continuously rotatable drive member journaled in the head and an intermittently rotated driven member secured to the tool spindle, a cam on the drive member, a first crank journaled in the head and arranged to be rocked by the cam, a second crank journaled in the frame, a link connecting said cranks for causing the head to swing, to carry the tool across said face of the wheel, when the drive member rotates, and means for swinging the second crank for also acting through the link to swing the head for carrying the dressing element across said face of the wheel, said last-mentioned means being arranged to hold the second crank stationary while the first crank is being rocked.

11. A machine as characterized by claim 10 in which the means for swinging the second crank and for holding it stationary while the first crank is being rocked comprises a spring, and in which there are dash-pot means for controlling the velocity at which the spring swings the second crank and a latch for holding the second crank cocked for operation by the spring.

12. A machine for sharpening gear cutting tools comprising a frame, a wheel spindle journaled in the frame, a head for supporting a dressing element, the head being mounted to swing on the frame for carrying the dressing element across the face of a sharpening wheel on the spindle, a crank journaled in the frame, a link connecting the crank and the head whereby when the crank is turned the head is swung, a spring connected between the frame and the crank for turning the latter, dash-pot means for controlling the velocity at which the spring operates the crank, an arm on the crank by which the latter may be turned to energize the spring, and a manually releasable latch for engaging the arm to hold it in the position thereof wherein the spring is energized.

13. A machine for sharpening gear cutting tools comprising a frame, a wheel spindle journaled in the frame, a head for supporting a dressing element, the head being mounted to swing on the frame for carrying the dressing element across the face of a wheel on the spindle, a spring arranged to act between the frame and the head, for swinging the latter, an operating arm pivoted to the frame and connected to the head for swinging the latter to energize the spring, and a latch for holding the arm in the position thereof wherein the spring is energized.

14. A machine for sharpening gear cutting tools comprising a frame, a wheel spindle journaled in the frame, a tool head having a tool spindle journaled therein, the head being mounted to swing on the base, an intermittent indexing mechanism including a continuously rotatable driven member journaled in the head and an intermittently driven member secured upon the tool spindle for rotation therewith, a cam on the drive member, and a follower of the cam arranged to cause the head to swing on the base, between intermittent rotational motions of the driven member, for carrying a tool on the tool spindle across the active face of a wheel on the wheel spindle.

15. A machine as characterized by claim 14 in which the driven member comprises a notched index plate, a plunger is carried by the head for locking engagement in the notches of the plate, and a cam is provided on the drive member for effecting operation of the plunger in time with the intermittent motion of the driven member.

16. A machine as characterized by claim 3 in which a resilient means is provided to constantly urge swinging motion of the head in one direction.

OLAF A. JOHNSON.

No references cited.